(No Model.) 2 Sheets—Sheet 1.
J. V. EBEL.
GLASS FURNACE.
No. 310,804. Patented Jan. 13, 1885.
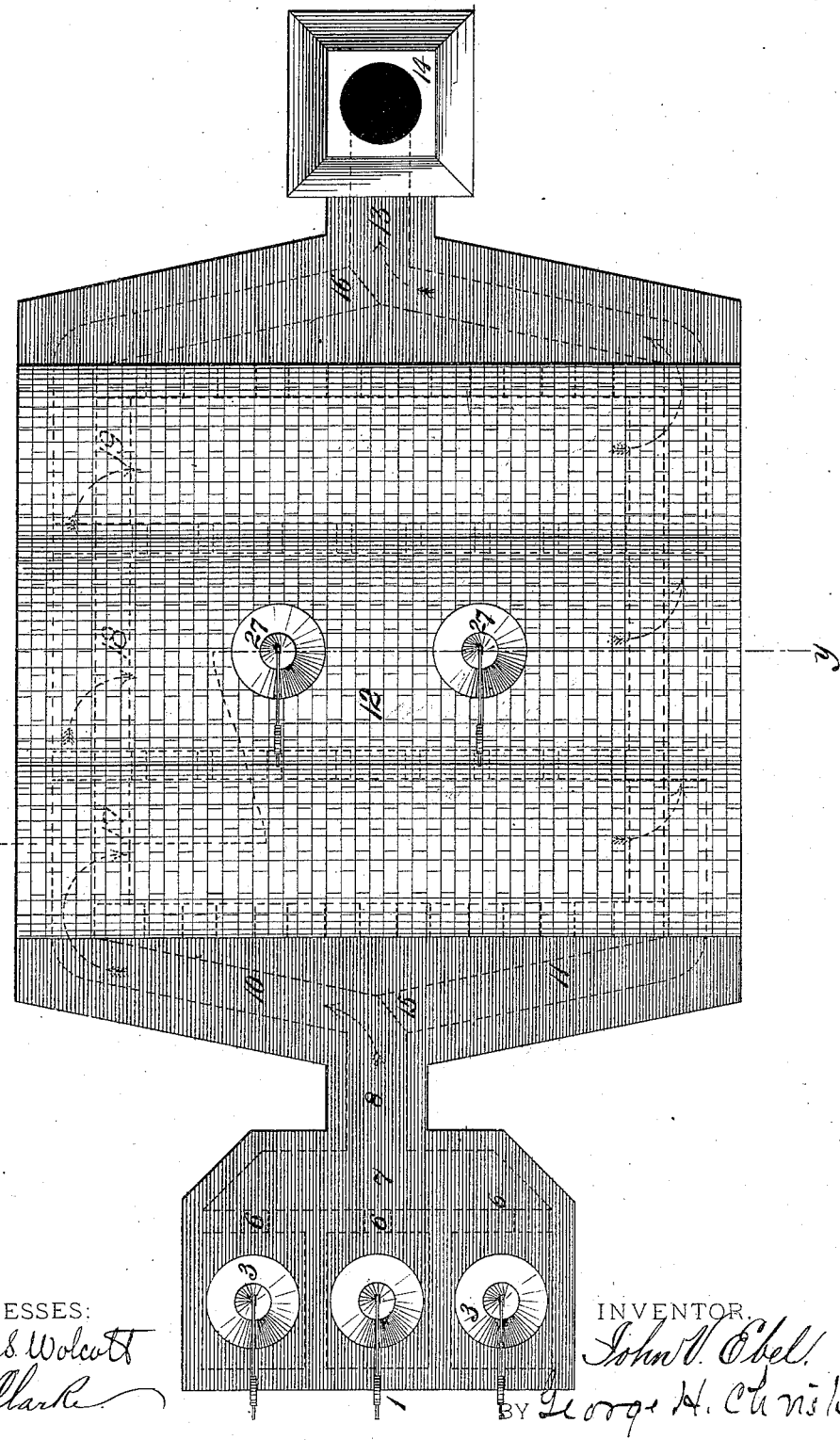
WITNESSES:
Darwin S. Wolcott
C. M. Clarke
INVENTOR
John V. Ebel
By George H. Christy
ATTORNEY.

(No Model.) 2 Sheets—Sheet 2.
J. V. EBEL.
GLASS FURNACE.
No. 310,804. Patented Jan. 13, 1885.
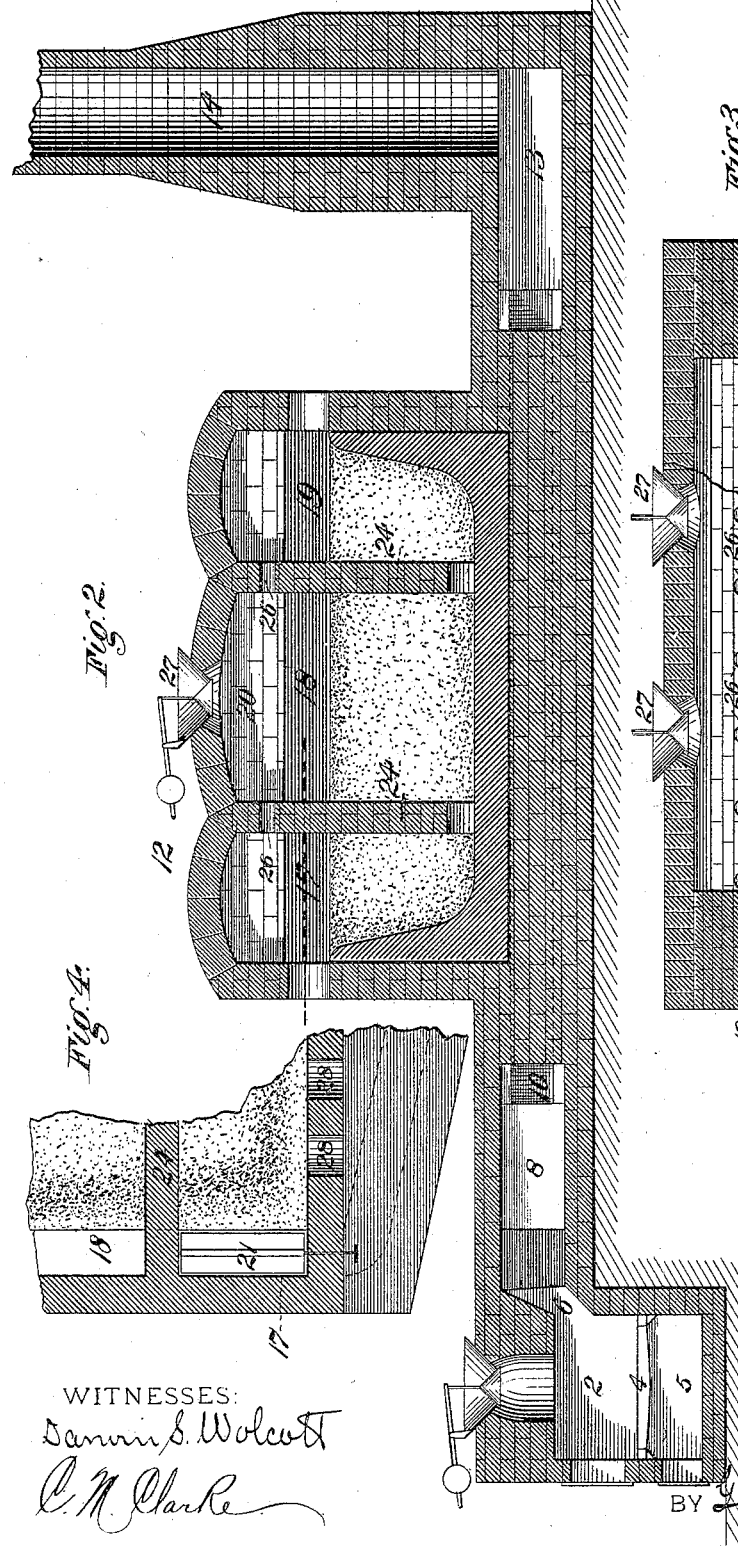
WITNESSES:
Darwin S. Wolcott
C. M. Clarke
INVENTOR,
John V. Ebel
BY George H. Christy
ATTORNEY.

UNITED STATES PATENT OFFICE.

JOHN V. EBEL, OF PITTSBURG, PENNSYLVANIA, ASSIGNOR OF TWO-THIRDS TO HENRY F. VOIGT, THEODORE L. E. ORTMAN, JOHN W. ALBERTSON, JAMES W. PATTERSON, AND JOSEPH O. C. CAMPBELL, OF SAME PLACE.

GLASS-FURNACE.

SPECIFICATION forming part of Letters Patent No. 310,804, dated January 13, 1885.

Application filed September 22, 1884. (No model.)

*To all whom it may concern:*

Be it known that I, JOHN V. EBEL, a subject of the Emperor of Germany, residing at Pittsburg, in the county of Allegheny and State of Pennsylvania, have invented or discovered certain new and useful Improvements in Glass-Furnaces, of which improvements the following is a specification.

In the accompanying drawings, which make part of this specification, Figure 1 is a plan view of my improved glass-furnace. Fig. 2 is a longitudinal vertical section of the same. Fig. 3 is a transverse section on the line $y\ y$, Fig. 1. Fig. 4 is a sectional detail view showing the rising flues and regulating-damper.

My invention relates to that class of furnaces in which the melting operation is continuous and uninterrupted, said operation being effected by the combustion of gases in the chamber containing the melting-pot; and the object of my invention is to so construct such a furnace that the gases from the generator are conducted into the combustion-chamber in a cold or cool condition, and, there mingling with heated air, are effectually consumed; and to this end my invention consists in the construction and combination of parts, all as more fully hereinafter described and claimed.

The generator 1 consists of two, three, or more generating-chambers, 2, provided with the usual top feeding-hoppers, 3, and the grate 4 and ash-pit 5. In the rear wall of the generating-chambers are formed the ports or openings 6, through which the gases and smoke pass from the generating-chambers into the common receiving-chamber 7, just in the rear of the generating-chambers. From the receiving-chamber 7 the gases pass into and along the flue 8 to the branch flues 10 and 11. These branch flues diverge, as shown in Fig. 1, the flue 10 passing along on one end of the furnace 12 and the flue 11 passing along the opposite end. Beyond the furnace the flues converge and unite in a common flue, 13, leading to the smoke-stack 14. At those points where the flues 10 and 11 diverge from the flue 8 and converge to the flue 13 are arranged valves 15 and 16, by which the direction of flow of the gases can be changed as desired.

At the ends of the furnace 12 are formed the rising flues 17, 18, and 19, connecting at their lower ends with the flues 10 and 11 and their upper ends opening into the combustion-chamber 20 of the furnace.

In the outside flues, 17 and 18, are arranged the valves 21, for the purpose of closing said flues as against the passage of the gases, and thereby causing all the gases to pass through the central flue, 18. The purpose of this construction will be more fully hereinafter described.

Within the combustion-chamber 20 is placed the melting-pot 23. This pot 23 and the combustion-chamber are divided longitudinally by the partitions or walls 24 into a central and two outside basins or receptacles, the position of said partition-walls corresponding in location or being in line with the division-walls of the rising flues 17, 18, and 19.

Through the lower edges of those portions of the partition-walls lying within the melting-pot are formed the passages 25, connecting the central with the two outside basins or receptacles of the pot, and through the upper portions of these partition-walls are formed the ports 26, through which air is admitted to the central portion of the combustion-chamber from the two outside portions. Through the top of the combustion-chamber are formed openings communicating with the central basin and provided with suitable hoppers, 27, through which the materials for forming the glass are admitted. Along both sides of the furnace are formed the working-holes 28, said holes communicating with the outside basins, and through these holes 28 the air necessary for the combustion of the gases in the chamber 20 is admitted.

In building my improved furnace I find that the generator must be placed at such distance from the melting-furnace that the gases shall be cooled before being admitted to the combustion-chamber, and in case it is not convenient to place the generator at the requisite distance for cooling the gases they should be passed over water or cooled in any other suitable manner.

In operating the furnace a wood fire is first built in the combustion-chamber, in order to heat the same, and after the walls of the combustion-chamber and melting-pot have been highly heated the generators are started, the gases therefrom escaping into the receiving-chamber 7, and passing from thence along the flue 8 into either one of the flues 10 and 11, according to the position of the valve 15. If the valve 15 is so adjusted as to turn the gases into the flue 10, then the opposite end of said flue, where it joins the flue 14, should be closed by the valve 16, thereby causing the gases to pass from the flue 10 into the rising flues 17, 18, and 19 on that end of the furnace, and thence into the combustion-chamber 20, where they mingle with the air admitted by the working-holes and are thoroughly consumed. The waste heat and other products of combustion escape from the combustion-chamber by the flues 17, 18, and 19 into the flue 11, along which they pass into the flue 13 and the stack 14. As soon as the pot and the combustion-chamber have been properly heated the materials for the glass are fed into the central basin of the melting-pot through the hoppers 27. The valves 21 in the rising flues 17 and 19, leading to the flue 10, are closed, so as to cause the greater part of the gases to pass through the central flue, 18, into the central basin of the melting-pot, and there mingle with air entering through the openings or ports 26 in the walls 24 from the outside basins, the air being highly heated as it passes through said basins. As the glass melts in the central basin it flows through the passages 25 into the outside basins, where it is clarified and heated to the proper working temperature, the valves 21 being opened to admit sufficient gas into said outside basins for the purpose. If at any time the glass in the outside or working basins becomes too hot, the valves 21 are closed, thereby cutting off the gas, and the air entering through the working-holes and flowing over the surface of the glass to the ports 26 will soon cool the glass to the proper temperature. By properly regulating the valves 21 in the outside rising flues, 17 and 19, the glass in the working basins or receptacles can be kept at a constant temperature. After the gases have been flowing in one direction—say through the flue 10—into the combustion-chamber for certain length of time—e. g., twenty or thirty minutes—the valves 15 and 16 are turned so as to cause gases to flow through the flue 11 to the combustion-chamber, and thence through the flue 10 to the stack. This reversal of the gases should be effected as often as necessary to keep all parts of the combustion-chamber and melting-pot at the same even temperature.

It will be observed by taking the air for supporting combustion a twofold function is effected—that is, the gas is cooled by the inflowing air, and the air is heated before it enters the central portion of the combustion-chamber, where the greatest heat is required and where the most perfect combustion is effected. If desired, the valves 21 in those flues, 17 and 19, through which the products of combustion are escaping for the time being may be entirely closed. Then whatever gases are admitted to the outside basins and are not there consumed will be carried with the heated air into the central combustion-chamber through the ports 26.

The above-described furnace may be adapted for the use of natural gas at any time by introducing burners for said gas into the upper portion of the rising flues 17 and 18 and 19, and in this case hot air would be carried along the flues 8, 10, and 11 from the generator, where the air would be heated by passing over bricks or other suitable materials heated by natural gas.

By placing the generator at a distance from the furnace proper, and providing a receiving-chamber between the generator and the flue leading to the furnace, I am enabled to smother, as it were, the flame from the generator, thereby preventing to a great extent the combustion of the gases until they reach the combustion-chamber of the furnace, where, coming in contact with the air from the working-holes and the heated walls of the combustion-chamber, they are thoroughly consumed, producing a high uniform heat; and, further, by cooling the gases as they pass from the generator to the furnace, the flow of said gases is delayed, and consequently the gases do not enter the furnace in larger quantities than can be readily consumed there on mingling with the air; and by insuring a thorough combustion of the gases by thus delaying the flow a great saving in fuel is effected.

The stems of the valves 15 and 16 projecting up above the furnace may be connected by a rod, in order that said flues may be operated simultaneously.

I claim herein as my invention—

1. In a glass-furnace, the combination of a generator provided with a receiving-chamber, the diverging and converging flues 10 and 11, a glass-working chamber connected at its ends with the flues 10 and 11, and regulating-valves located at the points of junction of said flues, substantially as set forth.

2. In a glass-furnace, the combination of a generator, the diverging flues 10 and 11, a glass-working chamber, rising flues located at the ends of the melting-chamber, and connecting said chamber with the flues 10 and 11, and regulating-valves located at the points of junction of said flues 10 and 11, substantially as set forth.

3. In a glass-furnace, the combination of the melting-pot provided with a central melting-basin, and side working-basins connected to the melting-chamber by suitable passages, flues 10 and 11, leading from a suitable generator, and rising flues 17, 18, and 19, connecting the ends of said basins with the flues 10 and 11, substantially as set forth.

4. The combination of a glass-furnace having a suitable combustion-chamber, and provided with working-holes along its sides, a melting-pot located within the combustion-chamber, partition-walls dividing the combustion-chamber and melting-pot into a central melting and side working compartments or basins, said walls being perforated at their upper and lower edges, as described, rising flues opening into the compartments of the combustion-chamber, and connected at their lower ends with flues 10 and 11, leading from a suitable generator and passing along the ends of the furnace, substantially as set forth.

5. The combination of a glass-furnace having a suitable combustion-chamber, and provided with working-holes 28 along its sides, a melting-pot located within the combustion-chamber, partition-walls 24, provided with openings 25 and 26, rising flues 17, 18, and 19, located at the ends of the furnace, valves 21, located in the side flues, 17 and 19, and the flues 10 and 11, substantially as set forth.

In testimony whereof I have hereunto set my hand.

JOHN V. EBEL.

Witnesses:
J. O'C. CAMPBELL,
THEODORE ORTMAN.